US012706653B2

(12) United States Patent
Ur Rehman et al.

(10) Patent No.: US 12,706,653 B2
(45) Date of Patent: Aug. 11, 2026

(54) METHODS, APPARATUS, AND SYSTEMS FOR DELAY SPREAD MEASUREMENT, REPORTING, AND CYCLIC PREFIX DETERMINATION

(71) Applicant: InterDigital Patent Holdings, Inc., Wilmington, DE (US)

(72) Inventors: Haseeb Ur Rehman, Winnipeg (CA); Young Woo Kwak, Woodbury, NY (US); Moon Il Lee, Melville, NY (US); Prasanna Herath, Laval (CA); Paul Marinier, Brossard (CA); Nazli Khan Beigi, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 130 days.

(21) Appl. No.: 18/853,380

(22) PCT Filed: Apr. 28, 2023

(86) PCT No.: PCT/US2023/020388

§ 371 (c)(1),
(2) Date: Oct. 1, 2024

(87) PCT Pub. No.: WO2023/212308

PCT Pub. Date: Nov. 2, 2023

(65) Prior Publication Data

US 2025/0240073 A1 Jul. 24, 2025

Related U.S. Application Data

(60) Provisional application No. 63/335,980, filed on Apr. 28, 2022.

(51) Int. Cl.

| | |
|---|---|
| ***H04B 7/06*** | (2006.01) |
| ***H04B 17/318*** | (2015.01) |
| ***H04L 27/26*** | (2006.01) |

(52) U.S. Cl.
CPC ......... *H04B 7/0626* (2013.01); *H04B 17/328* (2023.05); *H04L 27/2678* (2013.01)

(58) Field of Classification Search
CPC ................ H04B 7/0626; H04B 17/328; H04B 7/04013; H04B 7/06952; H04B 17/364;
(Continued)

(56) References Cited

U.S. PATENT DOCUMENTS

| | | | | |
|---|---|---|---|---|
| 10,841,024 | B1 | 11/2020 | Vieira et al. | |
| 12,495,420 | B2 * | 12/2025 | Zeineddine | H04L 5/0048 |

(Continued)

OTHER PUBLICATIONS

3rd Generation Partnership Project; "Technical Specification Group Radio Access Network; NR; Physical channels and modulation (Release 16)", 3GPP TS 38.211 V16.8.0, Dec. 2021, 134 pages.

(Continued)

*Primary Examiner* — Emmanuel Bayard
(74) *Attorney, Agent, or Firm* — Flaster Greenberg P.C.

(57) ABSTRACT

A wireless transmit/receive unit (WTRU) may receive configuration information that indicates one or more of a first transmission configuration indicator (TCI) state, a second TCI state, a first cyclic prefix (CP) size, a first channel state information-reference signal (CSI-RS) resource set, and a second CSI-RS resource set. The WTRU may determine a first delay spread and a first measurement value associated with a first CSI-RS. The WTRU may determine a second delay spread and a second measurement value associated with a second CSI-RS. The WTRU may send a first indication indicating whether the first delay spread is greater than or less than the first CP size.

18 Claims, 9 Drawing Sheets

(58) Field of Classification Search
CPC ............. H04L 27/2678; H04L 25/0216; H04L 27/2646; H04L 27/2695; H04L 27/2607; H04L 5/005; H04L 5/0092
USPC .......................................................... 375/260
See application file for complete search history.

(56) References Cited

U.S. PATENT DOCUMENTS

2020/0374724 A1 11/2020 Sarajlic et al.
2021/0036743 A1 2/2021 Bai et al.
2022/0116801 A1 4/2022 Dallal et al.
2023/0239823 A1* 7/2023 Liu .................. H04W 56/0045 370/350
2024/0357689 A1* 10/2024 Nilsson ................ H04L 5/0023

OTHER PUBLICATIONS

3rd Generation Partnership Project; "On CSI-RS for Beam Management", R1-1700134, ZTE, ZTE Microelectronics, 3GPP TSG RAN WG1 NR Ad-Hoc Meeting, Jan. 16-20, 2017, 7 pages.
Li, Yu-Ngok Ruyue, et al., "Beam Management in Millimeter-wave Communications for 5G and Beyond", IEEE Access, Dec. 29, 2019, 12 pages.

* cited by examiner

FIXED

FLEXIBLE

FIXED

FLEXIBLE

FLEXIBLE

FIXED

...

FIXED

FIXED

FLEXIBLE

METHODS, APPARATUS, AND SYSTEMS FOR DELAY SPREAD MEASUREMENT, REPORTING, AND CYCLIC PREFIX DETERMINATION

CROSS-REFERENCE TO RELATED APPLICATIONS

This application is the 371 National Stage of International Application No. PCT/US2023/020388, filed Apr. 28, 2023, which claims the benefit of U.S. Provisional Patent Application No. 63/335,980 filed on Apr. 28, 2022, the entire contents of which are incorporated herein by reference.

BACKGROUND

A radio signal may reach a receiver wireless transmit/receive unit (WTRU) antenna from two or more paths at different time intervals. A delayed signal component of an orthogonal frequency-division multiplexing (OFDM) symbol may be received after the start of a future symbol reception.

A measure of this phenomenon is called delay spread. More specifically, a delay spread may be a measure of a difference between a time of arrival of an earliest arriving multipath component of the signal and a time of arrival of a last multipath component of the signal.

Delay spread may introduce inter-symbol-interference (ISI) and/or the WTRU may not (e.g., be able to) decode a received signal, for example, due to the delay spread. To avoid ISI, a guard (e.g., time) period may be inserted between OFDM symbols. The guard (e.g., time) period may be in the form of a Cyclic Prefix (CP). The CP may ensure that the delayed components of a previous symbol are received before the reception of the next symbol. A longer than needed CP size may increase the system overhead. Therefore, appropriate CP size should be selected. CP sizes may be standardized based on the operated sub-carrier spacing (SCS) mode. The CP size may decrease (e.g., become smaller) as the SCS increases.

A reconfigurable intelligent surface (RIS) may be a smart surface which, for example has a capability to modify the signal propagation environment by changing its reflection characteristics. This may allow RIS to (e.g., appropriately) reflect the incident signal to form beams.

SUMMARY

Methods and apparatuses are provided for Artificial Intelligence (AI)/Machine Learning (ML) operations of a group of wireless transmit/receive units (WTRUs) for federated learning (FL). Methods and apparatuses are provided for a Network and Application Traffic Analyzer (NATA) module at a WTRU. Methods and apparatuses are provided for an AIML Management Function (AIML-MF) module at a WTRU. Methods and apparatuses are provided for enabling interactions between one or more WTRU components and one or more 5G Core (5GC) network functions via the user plane. Methods and apparatuses are provided for a Packet Train Monitoring Function (PTMF) in a User Plane Function (UPF). Methods and apparatuses are provided for a Packet Train Information (PTI) Analytics Network Data Analytics Function (NWDAF). Methods and apparatuses are provided for a WTRU Compute Information Analytics NWDAF.

A WTRU may send a subscription request message to a network node via a user plane function. The subscription request message may indicate one or more analytics IDs. The one or more analytics IDs may include a packet data unit (PDU) session ID and/or a WTRU ID. The WTRU may receive an analytics request message from the network node, for example via the user plane function. The analytics request message may indicate one or more statistics and/or predictions. The one or more statistics and/or predictions may include an available bandwidth prediction, level of network jitter, traffic pattern, training epoch, entropy, loss function, training epoch completion time, and/or battery status. The WTRU may determine the one or more statistics and/or predictions using an artificial intelligence/machine learning (AI/ML) management function (MF). The WTRU may send the one or more statistics and/or predictions to the network node, for example via the user plane function.

The WTRU may request modification of a flow's priority, for example based on the one or more statistics and/or predictions. The WTRU may change a quality of service (QoS) flow, for example by triggering a PDU session modification. The WTRU may move traffic from a first access technology to a second access technology, for example based on the one or more statistics or predictions. The WTRU may initiate a PDU session with another application server, for example based on the one or more statistics and/or predictions. The WTRU may move an AI/ML process from a first processor to a second processor. The WTRU may activate or deactivate one or more RAN resources, for example based on the one or more statistics and/or predictions.

The WTRU may receive configuration information. The configuration information may indicate one or more of a first transmission configuration indicator (TCI) state, a second TCI state, a first cyclic prefix (CP) size, a first channel state information-reference signal (CSI-RS) resource set, and a second CSI-RS resource set. The WTRU may determine a first delay spread and/or a first measurement value associated with a first CSI-RS. The first CSI-RS may be received in a first CSI-RS resource based on the first TCI state and the first CP size. The first CSI-RS resource may be a CSI-RS resource in the first CSI-RS resource set. The WTRU may determine a second delay spread and/or a second measurement value associated with a second CSI-RS. The second CSI-RS may be received in a second CSI-RS resource based on the second TCI state and a second CP size. The second CSI-RS resource may be a CSI-RS resource in the second CSI-RS resource set. The WTRU may send a first indication indicating whether the first delay spread is greater than or less than the first CP size.

The first indication may indicate that the first delay spread is less than the first CP size. The WTRU may send a second indication indicating the second CSI-RS resource, for example when first indication indicates that the first delay spread is less than the first CP size. The first indication may indicate that the first delay spread is greater than the first CP size. The WTRU may determine whether a difference between the first measurement value and the second measurement value is greater than a first threshold, for example when the first delay spread is greater than the first CP size. The WTRU may send a request for a change in CP size, for example when the difference between the first measurement value and the second measurement value is greater than the first threshold (e.g., when the first delay spread is greater than the first CP size). The WTRU may send a second indication indicating the second CSI-RS resource, for example if the difference between the first measurement value and the second measurement value is not greater than the first threshold (e.g., when the first delay spread is greater than the first CP size).

The WTRU may determine the first and second delay spreads and/or the second measurement value on a condition that a third measurement value associated with the first CSI-RS is below a second threshold. The WTRU may measure a first reference signal received power (RSRP). The first RSRP may be associated with a first CSI-RS resource of the first CSI-RS resource set. The WTRU may determine whether the first RSRP is greater than an RSRP threshold. The WTRU may measure a second RSRP, for example if the first RSRP is greater than the RSRP threshold. The second RSRP may be associated with a second CSI-RS resource of the second CSI-RS resource set.

The first indication may indicate that the first delay spread is greater than the first CP size. The WTRU may determine whether a difference between the first measurement value and the second measurement value is greater than a first threshold, for example when the first indication indicates that the first delay spread is greater than the first CP size. The WTRU may send a request for a change in CP size if the difference between the first measurement value and the second measurement value is greater than the first threshold, or send a second indication indicating the second CSI-RS resource if the difference between the first measurement value and the second measurement value is not greater than the first threshold, for example when the first indication indicates that the first delay spread is greater than the first CP size. The WTRU may send a second indication indicating the first delay spread if the difference between the first measurement value and the second measurement value is greater than the first threshold, for example when the first indication indicates that the first delay spread is greater than the first CP size. The WTRU may send a CSI report. The CSI report may indicate a quantized delay spread associated with the first delay spread and the second delay spread.

DETAILED DESCRIPTION

Figure 1A:
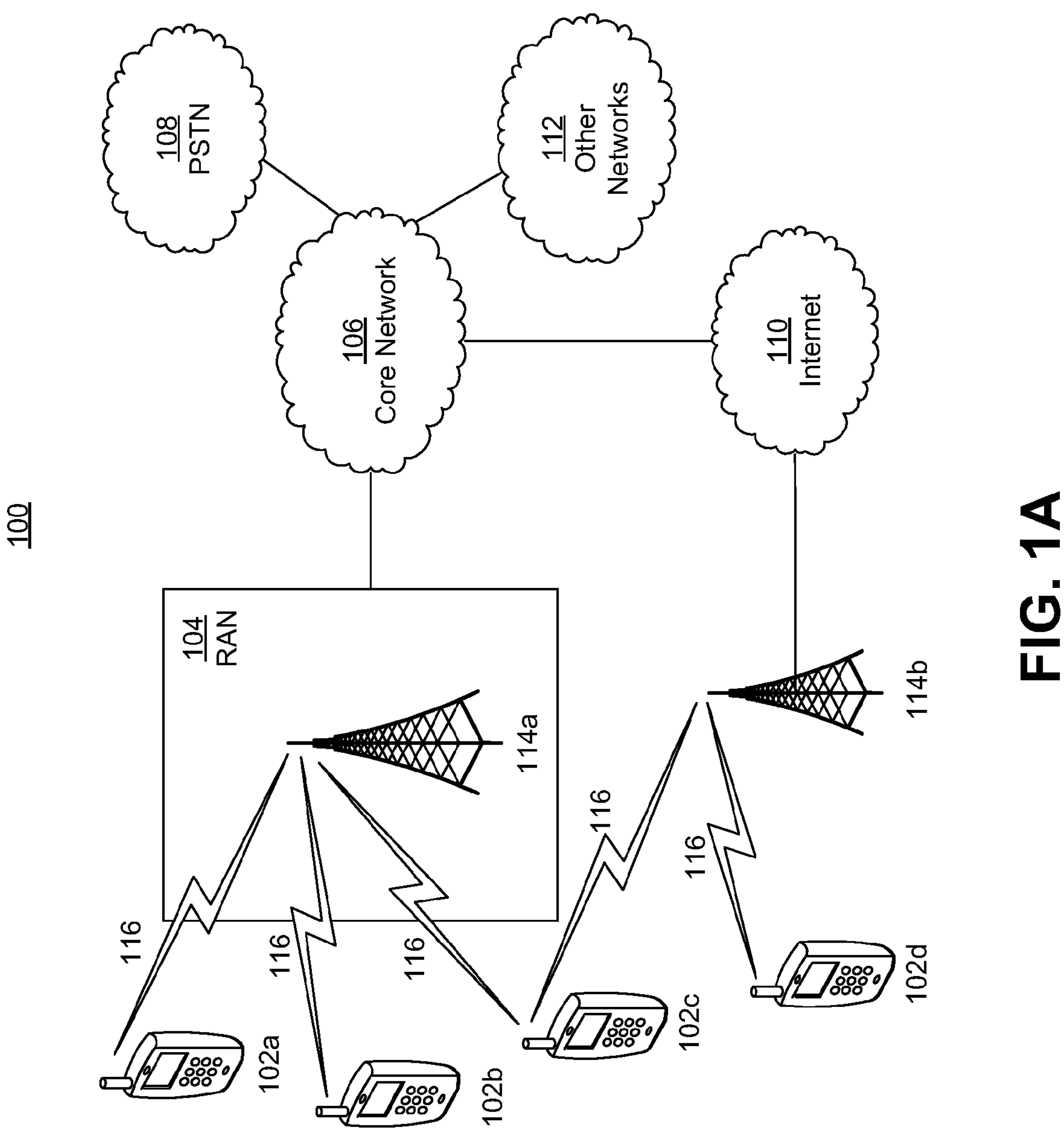
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with one or more of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, e.g., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
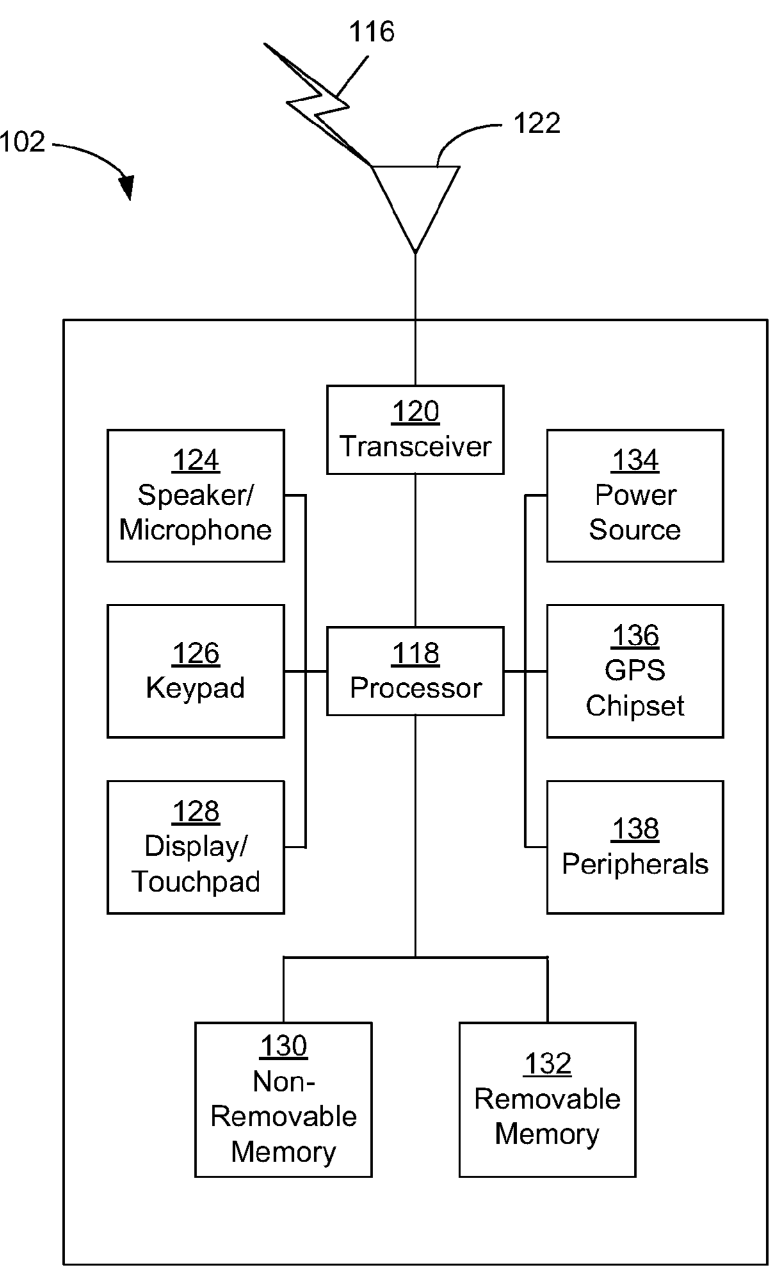
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
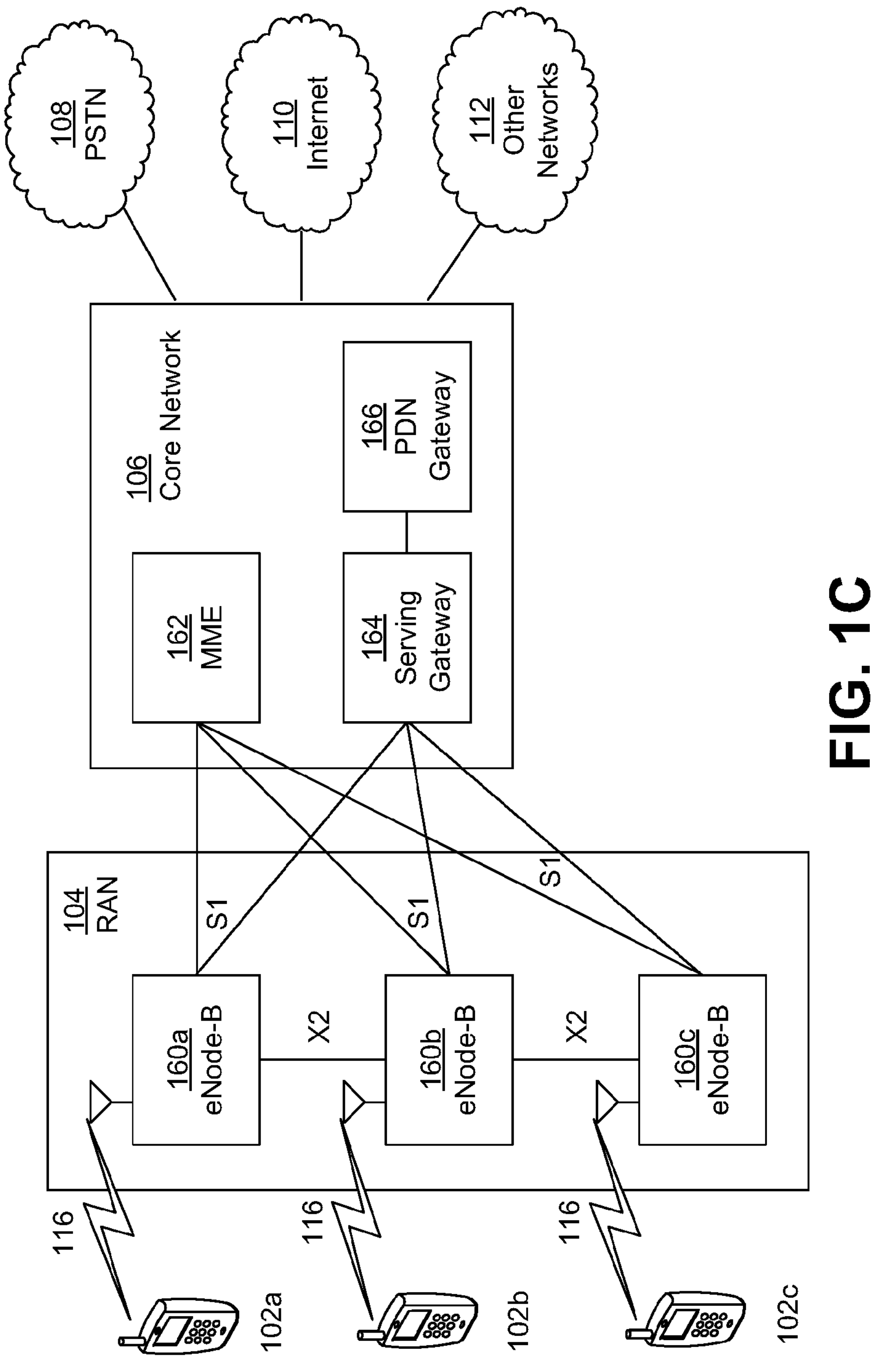
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
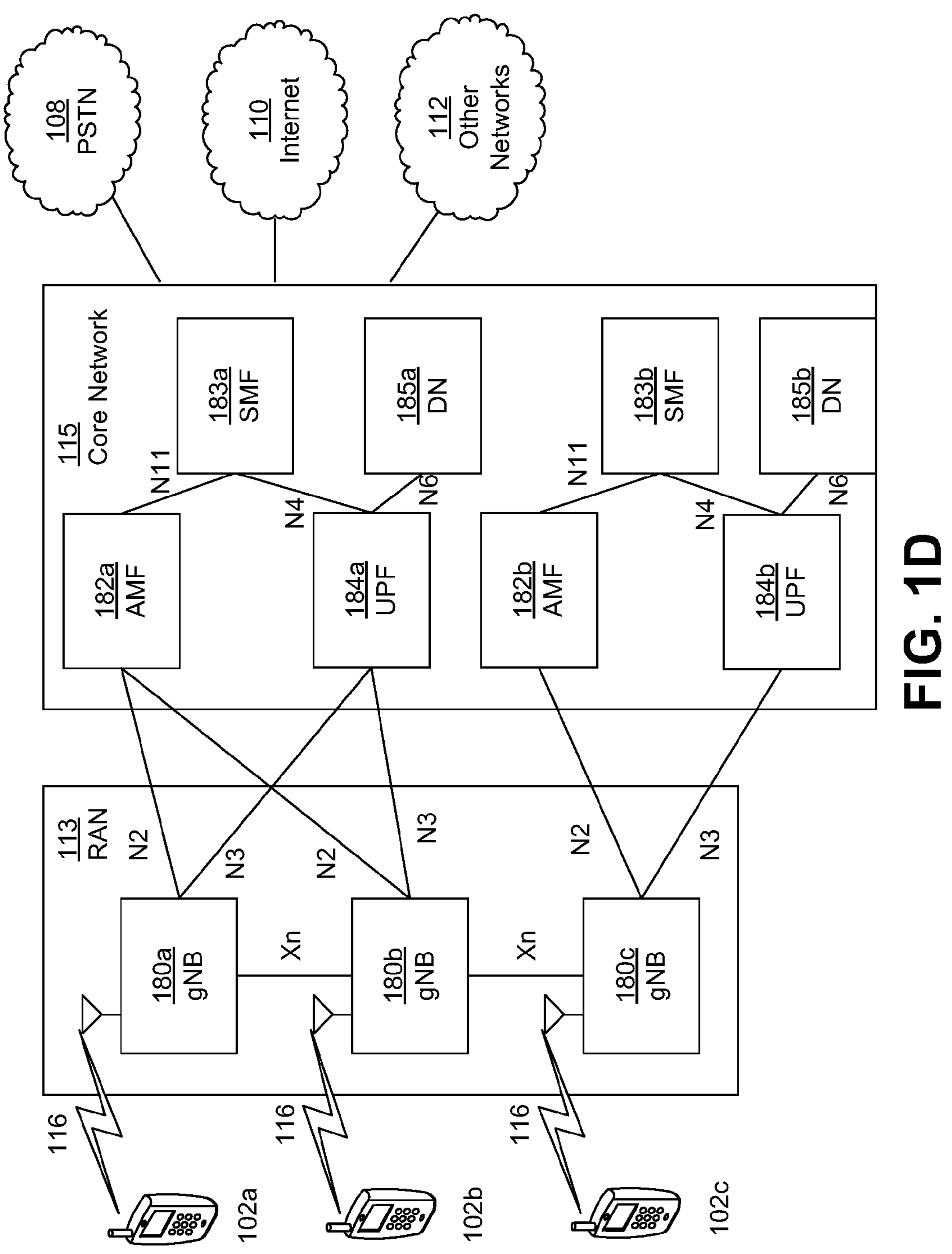
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include one or more of AMF 182*a*, 182*b*, one or more of UPF 184*a*, 184*b*, one or more Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Methods and apparatuses are provided for Artificial Intelligence (AI)/Machine Learning (ML) operations of a group of wireless transmit/receive units (WTRUs) for federated learning (FL). Methods and apparatuses are provided for a Network and Application Traffic Analyzer (NATA) module at a WTRU. Methods and apparatuses are provided for an AIML Management Function (AIML-MF) module at a WTRU. Methods and apparatuses are provided for enabling interactions between one or more WTRU components and one or more 5G Core (5GC) network functions via the user plane. Methods and apparatuses are provided for a Packet Train Monitoring Function (PTMF) in a User Plane Function (UPF). Methods and apparatuses are provided for a Packet Train Information (PTI) Analytics Network Data Analytics Function (NWDAF). Methods and apparatuses are provided for a WTRU Compute Information Analytics NWDAF.

A wireless transmit/receive unit (WTRU) may send a subscription request message to a network node via a user plane function. The subscription request message may indicate one or more analytics IDs. The one or more analytics IDs may include a packet data unit (PDU) session ID and/or a WTRU ID. The WTRU may receive an analytics request message from the network node, for example via the user plane function. The analytics request message may indicate one or more statistics and/or predictions. The one or more statistics and/or predictions may include an available bandwidth prediction, level of network jitter, traffic pattern, training epoch, entropy, loss function, training epoch completion time, and/or battery status. The WTRU may determine the one or more statistics and/or predictions using an artificial intelligence/machine learning (AI/ML) management function (MF). The WTRU may send the one or more statistics and/or predictions to the network node, for example via the user plane function.

The WTRU may request modification of a flow's priority, for example based on the one or more statistics and/or predictions. The WTRU may change a quality of service (QoS) flow, for example by triggering a PDU session modification. The WTRU may move traffic from a first access technology to a second access technology, for example based on the one or more statistics or predictions. The WTRU may initiate a PDU session with another application server, for example based on the one or more statistics and/or predictions. The WTRU may move an AI/ML process from a first processor to a second processor. The WTRU may activate or deactivate one or more RAN resources, for example based on the one or more statistics and/or predictions.

The WTRU may receive configuration information. The configuration information may indicate one or more of a first transmission configuration indicator (TCI) state, a second TCI state, a first cyclic prefix (CP) size, a first channel state information-reference signal (CSI-RS) resource set, and a second CSI-RS resource set. The WTRU may determine a first delay spread and/or a first measurement value associated with a first CSI-RS. The first CSI-RS may be received in a first CSI-RS resource based on the first TCI state and the first CP size. The first CSI-RS resource may be a CSI-RS resource in the first CSI-RS resource set. The WTRU may determine a second delay spread and/or a second measurement value associated with a second CSI-RS. The second CSI-RS may be received in a second CSI-RS resource based on the second TCI state and a second CP size. The second CSI-RS resource may be a CSI-RS resource in the second CSI-RS resource set. The WTRU may send a first indication indicating whether the first delay spread is greater than or less than the first CP size.

The first indication may indicate that the first delay spread is less than the first CP size. The WTRU may send a second indication indicating the second CSI-RS resource, for example when first indication indicates that the first delay spread is less than the first CP size. The first indication may indicate that the first delay spread is greater than the first CP size. The WTRU may determine whether a difference between the first measurement value and the second measurement value is greater than a first threshold, for example when the first delay spread is greater than the first CP size. The WTRU may send a request for a change in CP size, for example when the difference between the first measurement value and the second measurement value is greater than the first threshold (e.g., when the first delay spread is greater than the first CP size). The WTRU may send a second indication indicating the second CSI-RS resource, for example if the difference between the first measurement value and the second measurement value is not greater than the first threshold (e.g., when the first delay spread is greater than the first CP size).

The WTRU may determine the first and second delay spreads and/or the second measurement value on a condition that a third measurement value associated with the first CSI-RS is below a second threshold. The WTRU may measure a first reference signal received power (RSRP). The first RSRP may be associated with a first CSI-RS resource of the first CSI-RS resource set. The WTRU may determine whether the first RSRP is greater than an RSRP threshold. The WTRU may measure a second RSRP, for example if the first RSRP is greater than the RSRP threshold. The second RSRP may be associated with a second CSI-RS resource of the second CSI-RS resource set.

The first indication may indicate that the first delay spread is greater than the first CP size. The WTRU may determine whether a difference between the first measurement value and the second measurement value is greater than a first threshold, for example when the first indication indicates that the first delay spread is greater than the first CP size. The WTRU may send a request for a change in CP size if the difference between the first measurement value and the second measurement value is greater than the first threshold, or send a second indication indicating the second CSI-RS resource if the difference between the first measurement value and the second measurement value is not greater than the first threshold, for example when the first indication indicates that the first delay spread is greater than the first CP size. The WTRU may send a second indication indicating the first delay spread if the difference between the first measurement value and the second measurement value is greater than the first threshold, for example when the first indication indicates that the first delay spread is greater than the first CP size. The WTRU may send a CSI report. The CSI report may indicate a quantized delay spread associated with the first delay spread and the second delay spread.

A radio signal may reach a receiver WTRU antenna from two or more paths at different time intervals. A delayed signal component of an OFDM symbol may be received after the start of a future symbol reception.

A measure of the delayed signal component may be called delay spread. More specifically, a delay spread may be a measure of a difference between a time of arrival of an earliest arriving multipath component of the signal and a time of arrival of a last multipath component of the signal.

Delay spread may introduce inter-symbol-interference (ISI) and/or the WTRU may not (e.g., be able to) decode a received signal, for example, due to the delay spread. A guard (e.g., time) period may be inserted between OFDM symbols, for example, to avoid ISI. The guard (e.g., time) period may be in the form of a Cyclic Prefix (CP). The CP may ensure that the delayed components of a previous symbol are received before the reception of the next symbol. A longer than needed CP size may increase the system overhead. Therefore, appropriate CP size may be selected. CP sizes may be standardized, for example based on the operated SCS mode. The CP size may decrease (e.g., become smaller) as the SCS increases.

A reconfigurable intelligent surface (RIS) may a smart surface. The RIS may be configured to (e.g., be capable to) modify the signal propagation environment, for example by changing its reflection characteristics. RIS may (e.g., appropriately) reflect the incident signal to form beams.

Figure 2:
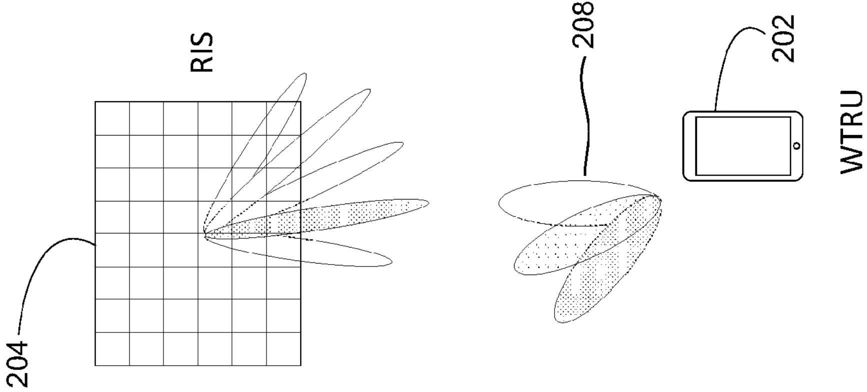
FIG. 2 depicts an example reconfigurable intelligent surface (RIS) enabled network.
Figure 2:
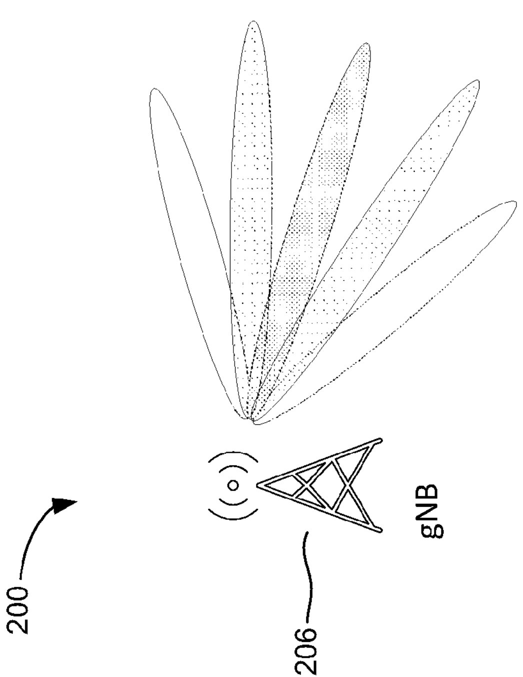

FIG. 2 depicts an example RIS enabled network 200. A signal reflected from the RIS 204 may travel a greater distance than other (e.g., one or more) signals. The signal may be sent from a WTRU 202 and/or a gNB 206. A WTRU 202 may experience a delay spread 208 for a beam. For example, the WTRU 202 may experience different delay spreads for different beams. The WTRU may experience a delay spread larger than the standard CP size for a beam. This may be important for high frequency communications for which, for example the CP size is small and/or when there are artificial delayed paths present. In reconfigurable intelligent surface (RIS)/relay enabled networks, for example, a WTRU may experience high delay spread (e.g., due to the delayed reflected path received from the surface/relay). The standard CP sizes, including both normal and/or extended, may be insufficient when receiving a signal from the surface/relay/network-controlled repeater. In some examples, CP sizes may not be determined based on the beam and/or delay spread measurement of a beam.

A WTRU may (e.g., be required to) perform delay spread measurements and/or delay spread reporting. A beam of the WTRU may be changed, for example based on the delay spread measurement and/or report. A procedure may (e.g., be required to) dynamically determine CP size, for example based on the delay spread measurement by the WTRU for a beam. The WTRU may obtain CP size information, for example (e.g., especially) for non-standard CP sizes. CP size information may be important (e.g., essential) for the WTRU to decode the received signal.

A WTRU may be configured with different types of measurement resources for performing delay spread measurements. The WTRU may report delay spread measurements and/or preferred CP size, for example in different ways. For example, the WTRU may report the preferred beam and/or CP size increments based on beam qualities and/or delay spread measurements. The WTRU may obtain CP size information in different ways (e.g., either explicitly, implicitly, or both).

A WTRU may transmit and/or receive a physical channel and/or reference signal according to one or more spatial domain filters. The term "beam" as herein may be used to refer to a spatial domain filter. The WTRU may transmit a physical channel and/or (e.g., reference) signal using the same spatial domain filter as the spatial domain filter used for receiving a reference signal (RS) (e.g., channel state information-reference signal (CSI-RS) and/or a synchronization signal (SS) block (SSB). The WTRU transmission may be referred to as "target" as herein. The received RS and/or SS block may be referred to as "reference" or "source" herein. The WTRU may (e.g., be said to) transmit the target physical channel and/or (e.g., reference) signal according to a spatial relation, for example with a reference to such RS and/or SS block.

The WTRU may transmit a first physical channel and/or signal according to the same spatial domain filter as the spatial domain filter used for transmitting a second physical channel or signal. The first transmission may be referred to herein as "target". The second transmission may be referred to herein as "reference" or "source". The WTRU may be said to transmit the first (e.g., target) physical channel and/or signal according to a spatial relation with a reference to the second (e.g., reference) physical channel and/or signal.

A spatial relation may be one or more of implicit, configured by RRC, and signalled by MAC control element (MAC CE) or downlink control information (DCI). A WTRU may (e.g., implicitly) transmit physical uplink shared channel (PUSCH) and/or demodulation reference signal (DM-RS) of PUSCH, for example according to the same spatial domain filter as an SRS indicated by an SRI indicated in DCI or configured by RRC. In another example, a spatial relation may be configured by RRC for an SRS resource indicator (SRI) and/or signalled by MAC CE (e.g., for a physical uplink control channel (PUCCH)). A spatial relation may also be referred to herein as a "beam indication".

The WTRU may receive a first (e.g., target) downlink channel and/or signal according to the same spatial domain filter and/or spatial reception parameter as a second (e.g., reference) downlink channel and/or signal. An (e.g., such) association may exist between a physical channel, for example PDCCH and/or PDSCH and a respective DM-RS. An (e.g., such) association may exist when the WTRU is configured with a quasi-colocation (QCL) assumption type D between corresponding antenna ports, for example at least when the first and second signals are reference signals. An (e.g., such) association may be configured as a transmission configuration indicator (TCI) state. A WTRU may be indicated an association between a channel state information-reference signal (CSI-RS) and/or SS block and a DM-RS, for example by an index to a set of TCI states configured by radio resource control (RRC) and/or signalled by MAC CE. An (e.g., such) indication may also be referred to herein as a "beam indication".

A WTRU may be configured by a gNB to transmit/receive one or more channels and/or signals, for example to perform delay spread measurements. The configuration for receiving the one or more channels and/or signals may be based on one or more of the following. The WTRU may be indicated to perform delay spread measurements through RRC signalling. For example, the WTRU may be indicated to perform delay spread measurements through a configuration message (e.g., CSI-ReportConfig). The WTRU may receive one or more of a periodic reference signal (RS), activated semi-persistent RS (e.g., via MAC CE), and triggered aperiodic RS (e.g., via DCI) associated with the CSI-ReportConfig, for example based on the configuration.

The delay spread measurement indication may be based on a configuration of CSI reporting parameters (e.g., delay spread indicator (DI) and/or inter-symbol interference indicator (III)). The WTRU may be configured with a measurement resource, for example to perform delay spread measurements. For example, WTRU may be configured with a transmission type in a CSI-ResourceSet to perform delay spread measurements.

The one or more DL channels and/or signals may be one or more of the following: an SS/PBCH block (SSB), CSI-RS (e.g., for one or more of tracking, beam management and/or CSI), PDCCH, and PDSCH.

The configuration for transmitting the one or more channels and signals may be based on one or more of the following. The WTRU may be indicated to perform UL transmissions for delay spread measurements, for example through RRC signalling. The WTRU may be indicated to transmit UL signals, for example in a UL resource/resource set configuration. The UL resource/resource set configuration may be for one or more of the following: sounding reference signal (SRS), PRACH, PUCCH, and PUSCH.

A WTRU may receive an SSB. The SSB may carry a primary synchronization signal (PSS), a Secondary Synchronization Signal (SSS), a Physical Broadcast Channel (PBCH), and/or a PBCH Demodulation Reference Signals (DMRS). Herein, the terms PSS, SS/PBCH block, SSS, PBCH, and PBCH DM-RS may be used interchangeably. The term PSS may be used herein to represent one or more of the content, information, payload, and/or a sequence of bits. The PSS sequence may be used to extract the strongest correlation spike, for example as the first step in SSB recovery and cell search. The WTRU may receive the primary synchronization signal (PSS) sequence (e.g., within one SSB), mapped in the first symbol relative to the start of the secondary synchronization signal (SSB) in time, and/or through configured subcarrier numbers (e.g., 56-182), for example relative to the start of the SSB in frequency.

A WTRU may use synchronization raster, for example to determine the frequency positions of the SSB (e.g., during a cell search). A WTRU may use synchronization raster during the cell search, for example when explicit signalling of the SSB is not present. The WTRU may generate (e.g., all) possible sequences for the PSS and/or (e.g., then) perform corresponding correlation functions to detect the strongest peak. The WTRU may determine the (e.g., respective) PSS sequence, for example upon successful detection of a correlation peak.

The reference PSS sequences may be centered in frequency, for example relative to the SSB frequency allocation. The WTRU may determine a primary frequency offset relative to the center frequency of the carrier, for example upon the successful detection of the PSS. The WTRU may estimate the synchronization time offset and/or delay spread, for example based on the detected PSS sequence. The WTRU may use the determined frequency and/or time offsets for the reception procedure and/or OFDM demodulation of the SSB.

A WTRU may perform the random-access (RA) procedure, for example to access a cell. The random-access procedure may be initiated upon a request of a Physical Random-Access Channel (PRACH) transmission, for example by higher layers and/or a PDCCH order. The PRACH configuration may include one or more of preamble index, preamble SCS, PRACH format, corresponding random access-radio network temporary identifier (RA-RNTI), and PRACH time and/or frequency allocation resources.

The PRACH preamble formats may include one or more of the length of Cyclic Prefix (CP), the number of sequences, and the guard time (e.g., if any). In an example, in PRACH A1 format, the number of sequences within each RO is two, and/or the number of time-domain PRACH occasions within a PRACH slot is six.

The WTRU may transmit random access preambles within the configured frequency resources (e.g., configured by higher layer parameters msg1-FrequencyStart and/or msgA-RO-FrequencyStart). The WTRU may determine the time resource allocations, for example based on the PRACH configuration index (e.g., higher-layer parameter prach-ConfigurationIndex, and/or msgA-PRACH-ConfigurationIndex) .

A WTRU may support one or more of the CP lengths, for example to accommodate different delay spreads. In some examples the WTRU may support one or more of the CP lengths in operation in higher frequencies. The WTRU may identify and/or support the modes of operation, for example based on different CP-lengths during the initial access.

In some examples, a mode of operation may be associated with an SSB. One or more parameter sets for the SSB may be used, defined, configured, and/or determined. Each parameter set may be associated with a mode of operation. In an example, a first mode of operation may be based on transmission and/or reception of channels and/or signals based on a first configured parameter (e.g., normal CP length). A second mode of operation may be based on transmission and/or reception of channels and/or signals based on a second configured parameter (e.g., longer CP length).

In some examples, one or more sequence generation sets may be used for PSS, SSS, and/or DMRS in PBCH generation. A WTRU may (e.g., alternatively) perform the (e.g., blind) detection, for example based on the different sequence sets during the system acquisition. The WTRU may perform a first mode of operation associated with the first sequence generation set, for example if the WTRU detects an SSB (e.g., PSS sequence) based on the first sequence generation set. The WTRU may perform a second mode of operation associated with the second sequence generation set, for example if the WTRU detects an SSB (e.g., PSS sequence) based on the second sequence generation set, and so forth.

A first sequence (e.g., m-sequence) may be used as one of the sequence generation sets, for example for PSS generation. The WTRU may determine to operate based on the first mode of operation that is associated with detection of the first sequence for the PSS (e.g., transmission and/or reception procedure based on normal CP length), for example if the WTRU identifies that PSS sequence is generated based on the first sequence set. Alternatively, or additionally, a second sequence (e.g., Zadoff-Chu sequence) may be used as a (e.g., another) set for the PSS sequence generation. The WTRU may determine to operate based on the second mode of operation that is associated with detection of the second sequence (e.g., transmission and/or reception procedure based on longer CP length), for example if the WTRU identifies that PSS sequence is generated based on a second sequence set.

A WTRU may estimate, measure, and/or determine one or more channel properties (e.g., channel delay spread). The WTRU may determine to use one or more channel properties (e.g., larger CP lengths) for transmission and reception of channels and/or signals, for example if the measurement on channel properties (e.g., channel delay spread) is larger than a configured threshold.

Alternatively, or additionally, a WTRU may perform initial access and/or cell selection based on preconfigured transmission/reception parameters (e.g., normal CP). The WTRU may determine that longer CP length is considered for transmission and/or reception of channel and/or signals, for example based on the PRACH preamble format (e.g., CP length).

A WTRU may receive, determine, and/or be configured with one or more PRACH formats (e.g., based on CP length) and/or one or more sets of time/frequency resources for PRACH transmission. Each PRACH format may be associated with a set of time/frequency resources. The WTRU may determine and/or be configured to use a first set of time/frequency resources for PRACH transmission, for example if the WTRU is configured and/or determines to use a first PRACH preamble format (e.g., normal CP length). The WTRU may determine and/or be configured to use a second set of time/frequency resources for PRACH transmission, for example if the WTRU is configured and/or determines to use a second PRACH preamble format (e.g., longer CP length).

For example, if the WTRU measures, estimates, and/or determines a first set of channel properties (e.g., channel delay spread), the WTRU may determine to use the first PRACH format (e.g., with first CP length). The WTRU may transmit (e.g., respective) PRACH in the first set of resources, for example for PRACH transmission. If the WTRU measures, estimates, and/or determines a second set of channel properties (e.g., channel delay spread), the WTRU may determine to use the second PRACH format (e.g., with second CP length). The WTRU may transmit respective PRACH in the second set of resources, for example for PRACH transmission.

A WTRU may receive an indication for a resource type indication (e.g., slot and/or symbol). The indication may be based on one or more of an RRC configuration, a MAC CE, and/or a DCI (e.g., WTRU-specific DCI and/or group DCI). The resource type indication may include fixed type information and/or flexible type information.

The WTRU may not apply the one or more signals and channels with different CP lengths for one or more resources with the fixed type, for example when the WTRU receives a configuration, an indication, and/or a trigger of one or more signals and channels with different CP lengths. The WTRU may transmit/receive channels and/or signals with a second type (e.g., reliable operation) for the first resource, for example when the WTRU receives a first type indication (e.g., efficient operation) for a first resource. The WTRU may determine downlink slots and/or uplink slots as fixed type slots.

The WTRU may apply the one or more signals and/or channels with different CP lengths for one or more resources with the flexible type, for example when the WTRU receives a configuration, an indication, and/or a trigger of one or more signals and channels with different CP lengths. The WTRU may transmit/receive channels and/or signals with different CP lengths for the first resource, for example, when the WTRU receives an indication and/or a trigger of one or more signals and/or channels with different CP lengths for a first resource.

The WTRU may receive one or more RSs, for example of the set of RSs with larger CP length in the flexible slots. The WTRU may receive one or more RSs of the set of RSs with normal CP length in (e.g., both of) the fixed and/or the flexible slots.

The WTRU may transmit one or more RSs, for example of the set of RSs with larger CP length in the flexible slots. The WTRU may transmit one or more RSs of the set of RSs with normal CP length in (e.g., both of) the fixed and/or the flexible slots. In some examples, if the WTRU does not receive any resource type indication, the WTRU may assume that all resources are fixed type resources.

Figure 3:
FIG. 3 depicts an example slot format indication.

FIG. 3 depicts an example of slot format indication 300. The resource type indication may be based on a bitmap and/or an indication of preconfigured resource type(s). The WTRU may receive an indication of one or more resource types, for example with a bitmap. Each 0 or 1 may indicate a fixed type and/or a flexible type for each resource in some examples. The WTRU may be configured with one or more groups of resource types, for example for multiple resources. The WTRU may receive an indication of a group of resource types for one or more resources, for example based on the one or more groups.

The WTRU may combine the one or more flexible resources into a smaller number of flexible resources to support different CP lengths, for example when the WTRU receives a configuration, an indication, and/or a trigger of one or more signals and channels with different CP lengths (e.g., in one or more flexible resources). N resources may be combined into M resources (e.g., where M<N), for example to support larger CP length. The WTRU may determine M, for example based on a size of CP length. N resources may be combined into M1 resources, for example if the one or more flexible resources are configured with a first CP size. N resources may be combined into M2 resources, for example if the one or more flexible resources are configured with a second CP size.

The WTRU may add a guard period, for example, when the WTRU combines N resources into M resources. In some examples, the guard period may be added (e.g., in the front and/or the end of M resources) and/or the WTRU may adapt its WTRU implementation (e.g., WTRU may modify its transmitter/receiver processing chain based on CP size) for different CP lengths.

The WTRU may determine a size of a guard period, for example based on a size of CP length. The WTRU may determine a first size of a guard period, for example if the one or more flexible resources are configured with a first CP size. The WTRU may determine a second size of a guard period, for example if the one or more flexible resources are configured with a second CP size.

A time duration of N resources and a time duration of M resources including larger CP length and one or more guard periods may be identical.

A resource may include one or more of a slot, a half slot, a symbol, a RS resource, a RS resource set, a beam, PRACH resource, PUCCH resource, control resource set (CORESET), search space, and etc.

A WTRU may receive a configuration (e.g., a configuration message) and/or an indication of transmission types, for example for one or more channels and signals. The transmission type may include one or more of the following: periodic, semi-persistent, and/or aperiodic. For example, the WTRU may be configured with one or more periodic resources and/or resource sets. The WTRU may semi-statically transmit/receive the one or more periodic resources and/or resource sets, for example based on the configuration.

The WTRU may be configured with one or more semi-persistent resources and/or resource sets. The WTRU may receive an indication of activation (e.g., via MAC CE and/or DCI) of the one or more semi-persistent resources and/or resource sets. The WTRU may activate the one or more resources and/or resource sets and transmit/receive the one or more resource resources/resource set, for example based on the activation. The WTRU may receive an indication of deactivation (e.g., via MAC CE and/or DCI) of the one or more semi-persistent resources and/or resource sets. Based on the deactivation, for example, the WTRU may deactivate the one or more resources and/or resource sets and/or may stop transmitting/receiving the one or more resource resources/resource set.

The WTRU may be configured with one or more aperiodic resources and/or resource sets. The WTRU may receive a trigger of activation (e.g., via DCI), for example of the one or more aperiodic resources and/or resource sets. For example, the WTRU may receive a trigger of one or more CSI report configurations. The one or more CSI report configurations may be associated with the one or more aperiodic resources/resource sets. The WTRU may transmit/receive the one or more resources and/or resource set, for example based on the trigger. The transmission/reception may be (e.g., only) for one transmission instance.

A WTRU may activate one or more of semi-persistent resources and/or resource sets, trigger aperiodic resources and/or resource sets and report delay spread related information to a gNB based on one or more of the following: measured/reported quality (e.g., reference signal received power (RSRP), reference signal received quality (RSRQ), signal to interference and noise ratio (SINR), channel quality indicator (CQI) and/or PDCCH hypothetical block error rate (BLER)), measured inter-symbol interference, number of (consecutive) NACKs, and/or a type of link.

The WTRU may activate/trigger resources/resource sets and/or report the measured quality to the gNB, for example if measured quality is less than or equal to a threshold. For example, if measured inter-symbol interference is larger than a threshold, the WTRU may activate/trigger resources/resource sets and/or report the measured quality to the gNB. In another example, if the WTRU reports multiple (e.g., consecutive) negative acknowledgements (NACKs) (e.g., within a time window), the WTRU may activate/trigger resources/resource sets and/or report the measured quality to the gNB. The WTRU may activate/trigger resources/resource sets and/or report the measured quality to the gNB, for example if the WTRU transmits/receives one or more channels with a first type of a link (e.g., an RIS link. In some examples, if the WTRU transmits/receives one or more channels with a second type of a link (e.g., a direct link), the WTRU may not activate/trigger resources/resource sets and/or report the measured quality to the gNB.

A WTRU may be configured with a delay spread measurement resource. The gNB may indicate to the WTRU, for example through an information element (IE) (e.g., CSI-ReportConfig), to perform delay spread measurement(s). The WTRU may be configured with a set of RSs, for example with different CP lengths for delay spread measurements. A DL signal (e.g., SSB or CSI-RS), for example with a (e.g., larger) CP length, may be used for WTRU measurement. An UL signal (e.g., PRACH) with a (e.g., larger) CP length may be used for WTRU transmission. The WTRU may be configured with slot formats (e.g., fixed or flexible slots). The WTRU may receive one or more RSs of the set of RSs with (e.g., larger) CP length in the flexible slots and/or the WTRU may receive one or more RSs of the set of RSs with normal CP length in (e.g., both of) the fixed and/or the flexible slots. The WTRU may transmit one or more RSs of the set of RSs with (e.g., larger) CP length in the flexible slots and/or the WTRU may transmit one or more RSs of the set of RSs with normal CP length in (e.g., both of) the fixed and/or the flexible slots.

RS transmission may be periodic/semi-persistent or aperiodic. Activation/trigger of the one or more RSs with (e.g., larger) CP length may be based on one or more of a gNB explicit indication, a WTRU report, or a measured quality, for example in a case of semi-persistent and/or aperiodic RS transmission.

For example, for the WTRU report or measure quality, one or more of CQI, L1-SINR, L1-RSRP, hypothetical PDCCH BLER, or interference measurement (e.g., Interference Quality Indicator (IQI)) may be used. A time gap may be added, for example in the front of the flexible slot, for transmission/reception of the RSs. The time gap (e.g., based on WTRU capability) may be used between the indication/trigger/activation and the RS transmission/reception.

The WTRU may be configured with a RS for delay spread reporting, for example, such as a delay spread RS. The WTRU may identify the RS for delay spread measurement, for example based on the resources used for RS transmission. For example, if the RS is transmitted in a special slot (e.g., in a flexible slot), the WTRU may identify the RS for delay spread measurement. The WTRU may identify the RS for delay spread measurement, for example through a configured parameter in CSI-ReportConfig. The WTRU may be configured with two or more RS using different SCS, for example separated in time. A (e.g., required) time gap between the RSs may be reported as a WTRU capability signalling. The WTRU may be configured with RS in using different SCS in two or more band-width parts (BWPs), for example activated simultaneously. The WTRU may be configured with the RSs. Each RS may be configured with a different BWP and/or SCS. The WTRU may activate the deactivated BWP after applying processing time based on the indication/activation/trigger, for example if the indicated/activated/triggered RSs configured in a deactivated BWP and SCS. The activation may apply until another activation/deactivation. The activation may apply only for a given time window. The WTRU may activate the original BWP, for example after the end of the activation.

A WTRU may be configured, indicated, and/or determined to measure a measurement reference signal, for example for one or more QCL parameters. The QCL parameters may include Doppler shift, Doppler spread, average delay, delay spread, and/or a spatial Rx parameter.

A WTRU may be configured with one or more measurement reference signals. Each measurement signal may be associated with a (e.g., specific) QCL parameter measurement. For example, a first measurement reference signal may be used and/or determined to measure a first QCL parameter (e.g., Doppler spread and shift) and/or a second measurement reference signal may be used and/or determined to measure a second QCL parameter (e.g., delay spread).

One or more reference signal patterns may be used for a QCL parameter measurement. A first measurement reference signal may have a time/frequency pattern which, for example may include reference signals in multiple time locations (e.g., multiple symbols within a time window). A second measurement reference signal may have a time/frequency pattern which may, for example include reference signals higher density in frequency domain (e.g., a larger number of REs used in an OFDM symbol as reference signal). A reference signal configuration and/or determination may be provided for a QCL parameter measurement. A WTRU may be configured with a measurement reference signal (e.g., CSI-RS, TRS, SSB), for example for a specific QCL parameter measurement. A WTRU may be indicated to perform a measurement on a reference signal, for example for a specific QCL parameter. A WTRU may be configured with one or more measurement reference signals. Each reference signal may be configured with one or more system parameters (e.g., CP length, subcarrier spacing, periodicity, frequency density, etc.)

A reference signal frequency location may be provided for a QCL parameter measurement. A WTRU may be configured with a measurement reference signal for a (e.g., specific) QCL parameter (e.g., delay spread) in a (e.g., specific) BWP. The (e.g., specific) BWP may have one or more of following properties. A BWP may be configured with a (e.g., largest) CP length, for example configured and/or supported for the frequency band. A BWP may be used for a (e.g., specific) QCL parameter measurement. A BWP may be used for a mode of operation (e.g., DL/UL transmission with RIS). A BWP may be configured with a different subcarrier spacing (SCS) from other BWPs.

A measurement reference signal for a (e.g., specific) QCL parameter (e.g., delay spread) may be configured in a BWP which, for example may be configured with a first CP length (e.g., when one or more CP lengths are used or configured for the frequency band). For example, one or more BWPs may be configured or used in a cell. A first BWP may be configured with a first CP length and/or the rest of BWPs may be configured with a second CP length. The measurement reference signal for a specific QCL parameter may be configured and/or used in the first BWP (e.g, only). The first CP length may be larger than the second CP length, for example, when the measurement reference signal for a specific QCL parameter may be configured and/or used in the first BWP (e.g, only).

A WTRU may be configured to measure a reference signal. The WTRU may perform BWP switching for the reference signal measurement, for example when a WTRU needs to measure a reference signal for a (e.g., specific) QCL parameter. The (e.g., specific) QCL parameter may be located in an inactive BWP. A measurement gap may be defined and/or used during which, for example the WTRU may not perform downlink reception (e.g., PDCCH monitoring) in the serving BWP (e.g., active BWP). The measurement gap length may be configured via a higher layer signalling. The measurement gap length may be determined based on subcarrier spacing and/or CP length of serving and target BWPs. A serving BWP may be the active BWP and/or a target BWP may be the inactive BWP in which, for example the WTRU may perform the measurement. The measurement gap may be used when the WTRU performs measurement in an inactive BWP. The WTRU may switch back to the active BWP before the measurement gap finishes, for example after the measurement.

In some examples, a time resource used for a measurement reference signal used for a QCL parameter (e.g., delay spread) or a system parameter measurement (e.g., required CP length) may be based on a first CP length and/or a time resource used for other signal transmission may be based on a second CP length. The time resource may be one or more of OFDM symbol(s), slot(s), subframe(s), and radio frame(s). One or more of following may apply: One or more CP lengths may be used. A set of CP lengths may be determined, for example based on one or more of configuration of cell, carrier, bandwidth part (BWP), physical/logical channel, frequency band (e.g., FR1, FR2-1, FR2-2), presence and/or use of RIS in a cell, and/or mode of operation configured for a WTRU and based on RIS.

A set of CP lengths may be determined, used, and/or configured. A first CP length in the set of CP lengths may be determined and/or used for a first set of time resources. A second CP length in the set may be determined and/or used for a second set of time resources.

The first time resource may be a resource determined for downlink transmission and/or the second time resource may be a resource determined for a flexible resource (e.g., a resource that can be used for either downlink or uplink). Alternatively, or additionally, the second time resource may be a resource determined for delay spread measurement.

The first time resource may be a resource determined for downlink transmission/reception, for example from a first transmission reception point (TRP) and/or serving cell. The second time resource may be a resource determined for downlink transmission/reception, for example from a second TRP and/or RIS The first CP length may be determined in a cell-specific manner (e.g., indicated and/or configured in a broadcasting signal, for example SIB). The second CP length may be determined in a WTRU-specific manner (e.g., indicated and/or configured in RRC, MAC-CE, and/or DCI)

The first CP length may be determined and/or used for a resource used for a downlink transmission from a first TRP and/or single TRP transmission. The second CP length may be determined and/or used for a resource used for a downlink transmission from a first TRP and a second TRP, or multi-TRP transmission. Additionally, or alternatively, the second CP length may be determined and/or used for a resource used for a joint downlink transmission from a serving cell or serving TRP and RIS.

The first CP length may be used for a resource used for a first mode of operation (e.g., DL/UL transmission without RIS). The second CP length may be used for a resource used for a second mode of operation (e.g., DL/UL transmission with RIS).

The first CP length may be determined and/or configured by a gNB. The second CP length may be the largest CP length within the set of CP lengths, for example determined and/or used.

Herein, RIS may be interchangeably used with IRS (intelligent reflection surface), TRP, smart repeater, network-controlled repeater, network controlled RIS, beam based repeater, and/or beam based smart repeater.

A WTRU may be configured to report a delay spread, for example, via an IE (e.g., CSI-ReportConfig). The WTRU may report a one bit delay spread quality, for example as part of CSI-Report (e.g., WTRU may transmit 1, when measured delay spread is less/smaller than the CP size of measured RS and 0 otherwise). The WTRU may report a quantized delay spread measurement. The WTRU may report a preferred CP size. The WTRU may be configured with candidate CP sizes, for example for reporting. The WTRU may report delay spread information (e.g., either one bit or actual value) of one or more RSs, for example together in one report. In some examples, if any delay spread measured in the one or more RSs is larger than the CP size, the WTRU may report 1 and 0 otherwise. The WTRU may report a largest and/or smallest delay spread of the one or more RSs. The WTRU may report delay spread value for the RS with smallest/largest delay spread and/or one bit delay spread quality for other RSs. The WTRU may report delay spread value for the RS with smallest/largest delay spread and/or the differential delay spread between delay spread of the RS with smallest delay spread and that of other (e.g., another) RS.

A WTRU may be configured, indicated, and/or determined to report and/or indicate one or more delay spread measurements (e.g., delay spread, average delay, or delay spread related measures such as CP size), for example to the gNB. The WTRU may be configured to, indicate, and/or determine to report and/or indicate one or more delay spread measurements based on the measurements WTRU may perform, for example by using on one or more delay measurement reference signals (e.g., measurement RSs). In some examples, the WTRU may be configured to report one or more delay spread measurements via RRC signalling and/or MAC-CE indication. The WTRU may be configured to monitor delay spread measurements via RRC signalling. In some examples the WTRU may be configured to activate reporting and/or an indication via MAC-CE and/or DCI indication.

For example, a WTRU may be configured to monitor delay spread measurements by using a set of RSs. The set of RSs may be configured by a CSI-ResourceConfig. The WTRU may be configured to report one or more delay spread measurements on PUCCH and/or PUSCH. In some examples, the WTRU may be configured to monitor and/or report one or more delay spread related measures indicated and/or configured by an IE CSI-ReportConfig. The CSI-ReportConfig may be triggered by DCI and/or MAC-CE. In some examples, a WTRU may be configured to measure delay spread measurements via one or more of RRC signalling, MAC-CE indication, and DCI indication. The WTRU may report delay spread measurements, for example based on WTRU determination.

The WTRU may report delay spread measurements if a delay spread measurement of one or more measurement RSs exceeds or fall below preconfigured values. In some examples, the WTRU may report delay spread measurements in response to SCS. For example, if the WTRU is configured with a SCS higher/lower than a preconfigured value, WTRU may report delay spread measurement of a set of measurement RSs. The WTRU may report delay spread measurements in response to FR. For example, if the WTRU is configured with FR2-2, WTRU may report delay spread measurements of a set of measurement RSs.

The WTRU may report delay spread measurements in response to a measurement or metric, for example related to a mobility aspect. The WTRU may report delay spread measurements corresponding to a set of measurements RSs, for example if the speed estimate based on positioning measurement or channel estimations exceeds a predefined threshold. In another example, if the Doppler measurement exceeds a predefined threshold, the WTRU may report delay spread measurements corresponding to a set of measurement RSs.

A WTRU may report delay spread measurements based on a type of connected network node. For example, when a WTRU is connected to specific type of network nodes (e.g., IRS, relay), the WTRU may report delay spread measurements of a set of measurement RSs. If the WTRU is connected (e.g., only connected) to a gNB, the WTRU may not report delay spread measurements of set of measurement RSs in some examples.

A WTRU may report delay spread measurements based on beam quality measurements. For example, a WTRU may report delay spread measurement of a set of measurement RSs when a beam quality measurement (e.g., L1-RSRP, L1-SINR, CQI, and/or radio link quality, for example hypothetical BLER of DL/UL physical channel) of one or more configured and/or indicated set of beam RSs is less than (e.g., drops below) a preconfigured quality level.

A WTRU may be configured, indicated, or determine to report one or more following delay spread measurements. The WTRU may report and/or indicate delay spread quality as a part of CSI-Report. In some examples, for a set of measurement RSs configured by a CSI-ResourceConfig, the WTRU may indicate or configure by an IE CSI-ReportConfig to report 1 (0) bit if the measured delay spread measurement is less and/or greater than the CP size of each measurement RS.

In examples, a WTRU may indicate all RSs with measured delay spread is less and/or greater than the RS's CP size. For example, a WTRU may indicate a set of bits. Each bit may correspond to a RS in a CSI-ResouceConfig. Bit 0 may indicate a measured delay spread is less than the RS's CP size and/or bit 1 may indicate the measured delay spread is greater than the RS's CP size. In some examples, a WTRU may indicate bit 1 if the measured delay spread of one or more RSs of a set of RSs is greater than a (e.g., their) CP size. Otherwise, the WTRU may indicate bit 0 (e.g., if the measured delay spread of one or more RSs of a set of RSs is less than a CP size).

A WTRU may measure delay spread of a set of measurement RSs and/or indicate the RS corresponding to the largest delay spread and/or the corresponding delays spread measurements. The WTRU may report quantized delay spread measurement for a set of measurement RSs, for example with a preconfigured and/or indicated number of quantization levels. For example, the WTRU may indicate and/or report one or more preferred CP sizes out of a set of configured candidate CP sizes. Additionally, or alternatively, the WTRU may indicate the lowest acceptable CP size out of set of candidate CP sizes. For example, for a set of measurement RSs, WTRU may indicate the lowest acceptable CP size out of set of candidate CP sizes.

In some examples, for a set of N measurement RSs, a WTRU may report the measured delay spread of M (e.g., M<=N) RS with largest and/or smallest delay spread and/or a one bit delay spread quality of other (e.g., the rest) of the N-M RSs. For example, the WTRU may indicate bit 1 if the delay spread measured by each N-M remaining RSs exceeds and/or is less than (e.g., falls below) a preconfigured value. In some examples, for a set of N measurement RSs, a WTRU may report the measured delay spread of RS with the largest and/or smallest delay spread and/or for each remaining RSs the difference between their delays spread and delay spread of the RS with the largest and/or smallest delays spread.

In some examples, for a set of N measurement RSs, a WTRU may report the measured delay spread of M (e.g., M<N, M>1) measurement RSs (e.g., $d_1, d_2, \ldots, d_M$, where $d_M \leq d_M$-1, $\ldots \leq d_1$) corresponding to the largest delay spreads. The WTRU may report the difference between the (e.g., their) delay spread and delay spread $d_M$, for each remaining N-M measurement RSs and/or subset of measurement RSs.

In some examples, for a set of N measurement RSs, a WTRU may report the measured delay spread of M (e.g., M<N) measurement RSS (e.g., $d_1, d_2, \ldots, d_M$, where $d_1 \leq d_2, \ldots \leq d_M$) corresponding to the smallest delay spreads. The WTRU may report the difference between the (e.g., their) delay spread and delay spread $d_M$ for each remaining N-M measurement RSs and/or subset of measurement RSs.

A WTRU may be configured to indicate one or more beams and/or a CP Enhancement. The WTRU may keep track of delay spread measurements for two or more RSs (e.g., denoting different beams). The WTRU may indicate CP enhancement and/or a different preferred beam, for example based on the delay spread measurements and/or beam quality. For example, a WTRU may keep track of delay spread measurements of a best beam and/or a second best beam. The WTRU may indicate beam steering to the second best beam and/or CP enhancement for the best beam, for example based on the delay spread measurements and/or quality of the two beams. The WTRU may be configured with a beamquality-CP-Threshold. The threshold (e.g., beamquality-CP-Threshold) may be biased towards beam steering (e.g., if CP size change unfavorable). The WTRU may indicate CP enhancement, for example if the WTRU measures high delay spread for its currently activated beam and/or the difference between quality of the currently activated beam and the second best beam is greater than beamquality-CP-Threshold. For example, the WTRU may indicate CP enhancement for the current beam if (quality (current beam)−quality (second best beam)>beamquality-CP-Threshold. For example, the WTRU may determine whether a difference between a first measurement (e.g., associated with the currently activated beam) and a second measurement (e.g., associated with the second best beam) is greater than a threshold. The WTRU may indicate beam steering if the WTRU measures high delay spread for its currently activated beam and/or the difference between quality of the currently activated beam and second best available beam is less (e.g., smaller) than a beamquality-CP-Threshold. For example, the WTRU may indicate preferred beam if (quality (current beam)−quality (second best beam)<beamquality-CP-Threshold. The WTRU may receive a confirmation of the indicated preference (e.g., beam steering or CP enhancement), for example from the gNB. In some examples, the WTRU may receive a confirmation of the indicated preference through RRC (e.g., through SRSConfig). The WTRU may receive a confirmation of the indicated preference, for example through TCI state. The TCI state may indicate beam steering and/or CP size modification. For example, the WTRU may send a request for a change in CP size if the difference between the first measurement and the second measurement is greater than the threshold. The WTRU may send an indication indicating a CSI-RS resource associated with the second measurement if the difference between the first measurement and the second measurement is not greater than the threshold.

Figure 4:
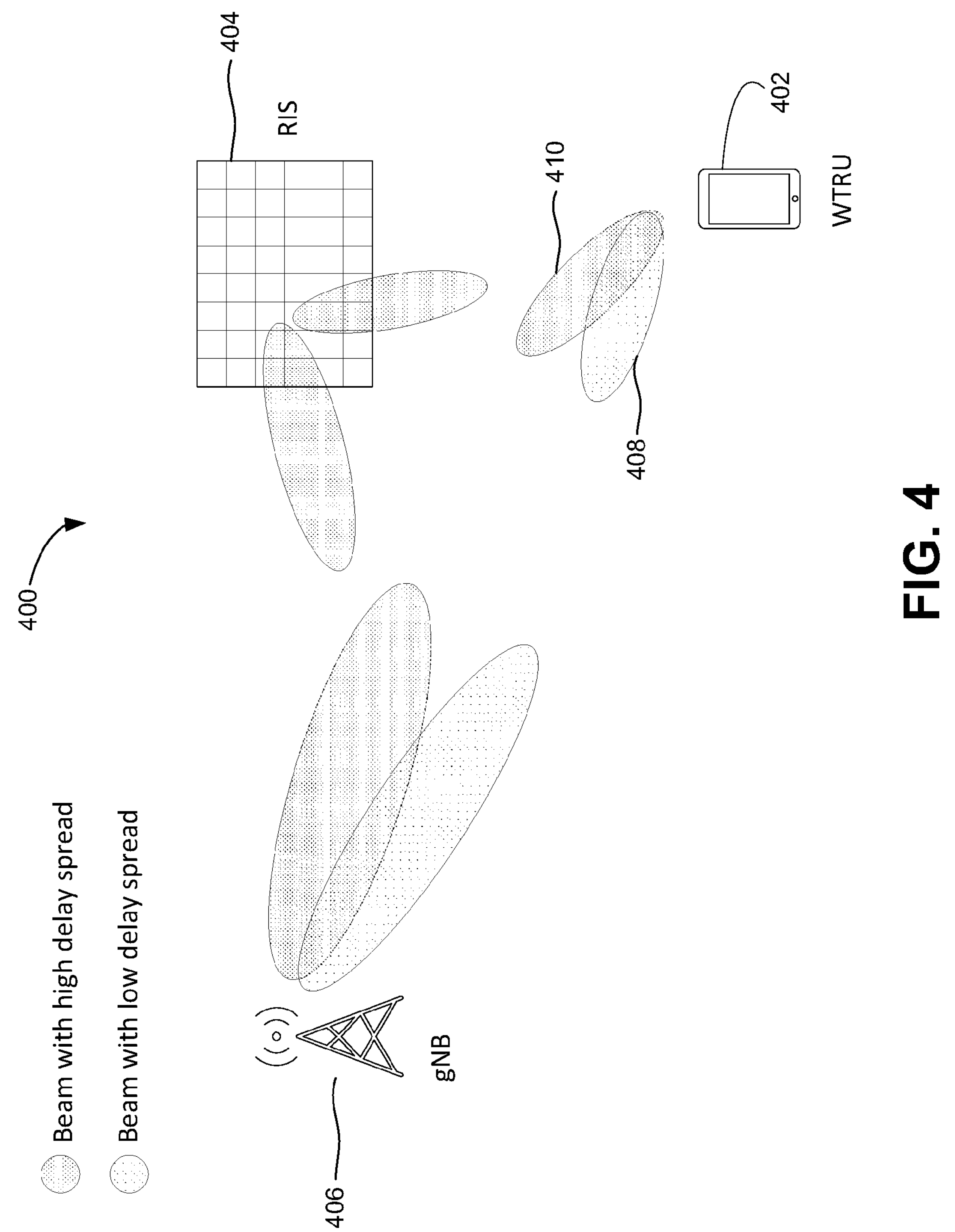
FIG. 4 depicts an example beam arrangement with different beams having different delay spread characteristics.

FIG. 4 depicts an example beam arrangement 400 with different beams that may have different delay spread characteristics. A WTRU 402 may keep track of different beams based on delay spread measurements. The WTRU 402 may receive a signal from a RIS 404 and/or a gNB 406. The WTRU 402 may keep track of delay spread measurements associated with two or more beams (e.g., such as beams 408, 410). For example, the WTRU 402 may keep track of delay spread measurements of the highest quality beam 408 and/or the second highest quality beam 410. The WTRU 402 may keep track of (e.g., monitor) beams for which the measured delay spread is less (e.g., lower) than the standard CP size of the WTRU's SCS mode of operation.

The WTRU 402 may keep track of (e.g., monitor) delay spread measurements for the highest quality beam 408 and/or beams for which delay spread is less (e.g., lower) than the standard CP size of the current SCS mode of operation. For example, a WTRU 402 may keep track of a highest quality beam 408 and the highest quality beam for which delay spread is less (e.g., lower) than standard CP size.

The WTRU 402 may request and/or indicate a preferred beam and/or CP size change and/or enhancement for the current beam, for example based on the delay spread measurements and/or qualities of the beams. The WTRU 402 may be configured with a beamquality-CP-Threshold. In some examples, the WTRU 402 may indicate and/or request CP enhancement and/or change for a beam based on the delay spread measurement of the beam and/or the configured beamquality-CP-Threshold. For example, the WTRU 402 may indicate and/or request CP change and/or enhancement for a high delay spread beam if the difference between the qualities of a high delay spread beam and a low delay spread beam is greater than the beamquality-CP-Threshold. In another example, the WTRU 402 may indicate and/or request CP change and/or enhancement for the currently activated beam if a delay spread of the currently activated beam is higher than standard CP size, and/or the difference between the qualities of the currently activated beam and the highest quality beam 408 (e.g., with lower delay spread than standard CP size) is greater than a beamquality-CP-Threshold.

The WTRU 402 may indicate and/or request a preferred beam, for example based on the delay spread measurement of the currently activated beam and/or the configured beamquality-CP-Threshold. For example, the WTRU 402 may indicate and/or request a low delay spread beam if the difference between the qualities of a high delay spread beam 408 and a low delay spread beam is less (e.g., lower) than the beamquality-CP-Threshold. In another example, the WTRU 402 may indicate and/or request the highest quality low delay spread beam if the delay spread of the currently activated beam is greater (e.g., higher) than a standard CP size, and/or the difference between the qualities of the currently activated beam and the highest quality beam 408 (e.g., with lower delay spread than standard CP size) is less (e.g., lower) than beamquality-CP-Threshold.

The WTRU 402 may receive confirmation for the indication and/or request to change beam and/or CP size via one or more of RRC signalling, MAC CE signalling, and/or DCI. The WTRU 402 may receive a confirmation, for example via RRC signalling through SRSConfig. In some examples, the WTRU 402 may receive a CP-beam confirmation parameter. The WTRU 402 may receive a confirmation via one or more of MAC CE and/or DCI through TCI state. The TCI state may indicate beam steering and/or CP size change.

The WTRU 402 may be configured with CP size information and/or subcarrier spacing, for example for one or more TCI states. The CP size information may comprise an indication of one of a set of possible CP sizes (e.g., for the applicable subcarrier spacing), for example whether the CP size comprises a "normal" CP size or "extended" CP size. The CP size information may also comprise an offset from (e.g., compared to) a "normal" CP size. Configuration of CP size within a TCI state may be beneficial, for example when the propagation conditions associated with the use of such TCI state require a different CP (e.g., when the resulting delay spread is high).

In some examples, the WTRU 402 may receive CP information from a new and/or existing field of a DCI. For example, each (e.g., possible) value of a TCI field may be mapped to a (e.g., specific) CP information (e.g., possibly in addition to the TCI indication). For example, the CP information may be set to a first value when the most significant bit of the TCI field is set to one, a second value when the most significant bit of the TCI field is set to zero and the second most significant bit of the TCI field is set to one, and a third value otherwise.

A CP Size indication may be received by a WTRU. For example, the WTRU may receive an (e.g., explicit) indication of the CP size, for example through a TCI state. The WTRU may receive CP size information (e.g., carried by a TCI state) and/or QCL information. The WTRU may receive a (e.g., actual) CP size and/or a CP size offset to a standard CP size, for example for the current SCS mode of operation. The WTRU may receive an (e.g., implicit) indication of the CP size, for example through a TCI state. In some examples, an indication of CP size enhancement may be provided through TCI state 3-bit bitmap in DCI (e.g., for PDSCH).

A WTRU may be configured to obtain CP size information, for example through TCI bitmap inside DCI. A WTRU may be configured to decode a CP size, for example as a multiple of standard CP size of the currently operated SCS mode of WTRU. For example, a TCI state (e.g., 1, X, X) may correspond to a CP size $CP_{(1, X, X)}=3CP_{standard}$, where for example, X may denote a don't care bit (e.g., may be either 0 or 1) and/or $CP_{standard}$ may denote the standard CP size for the currently operated SCS mode of the WTRU. A TCI state (e.g., 0, 1, X) may correspond to a CP size of $2CP_{standard}$. A TCI state bitmap may denote a CP size offset. For example, $CP_{(1, X, X)}=CP_{standard}+1024Tc$.

Figure 5A:
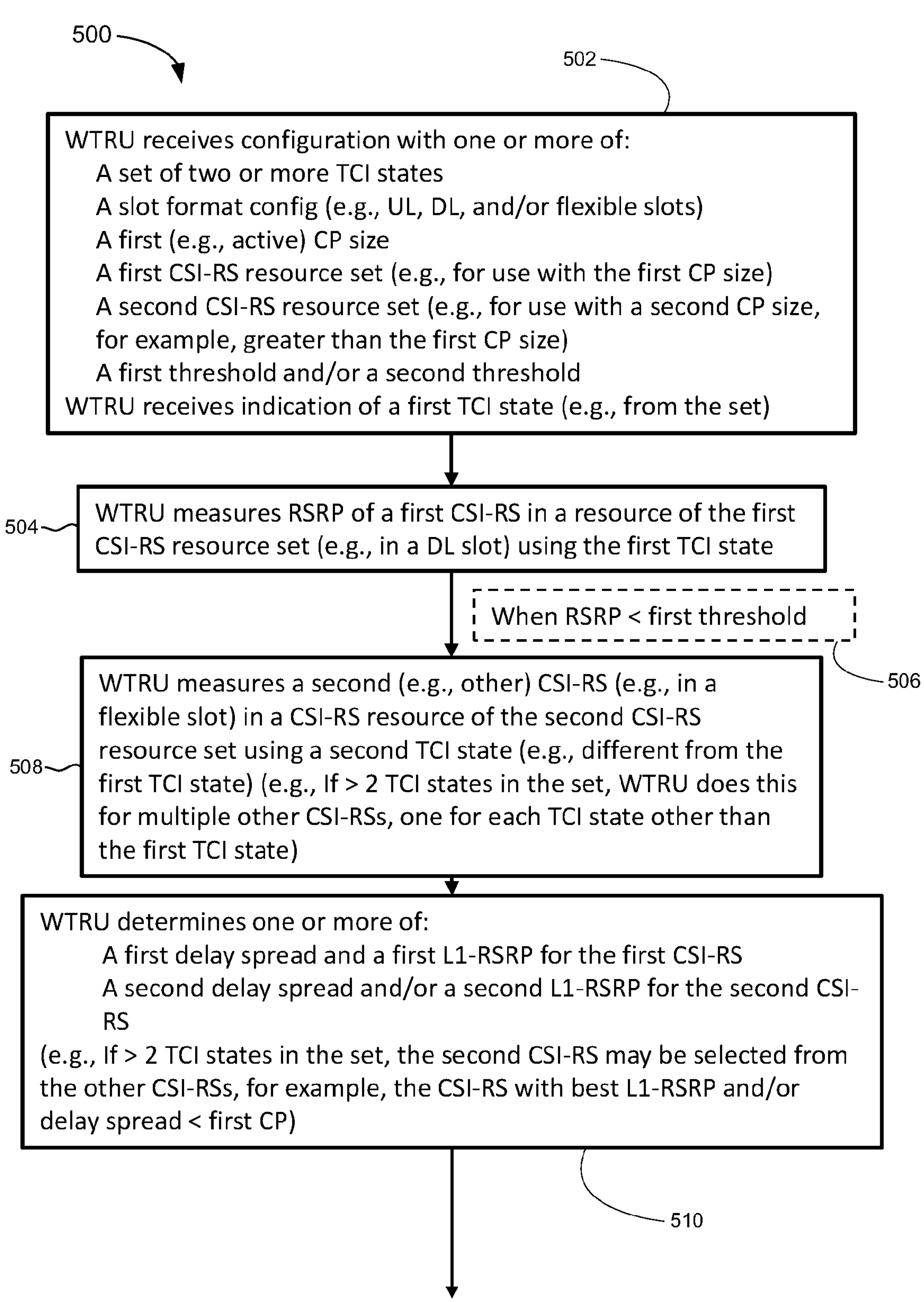
FIGS. 5A and 5B depict a flow diagram illustrating an example delay spread measurement and beam/CP switching process.
Figure 5B:
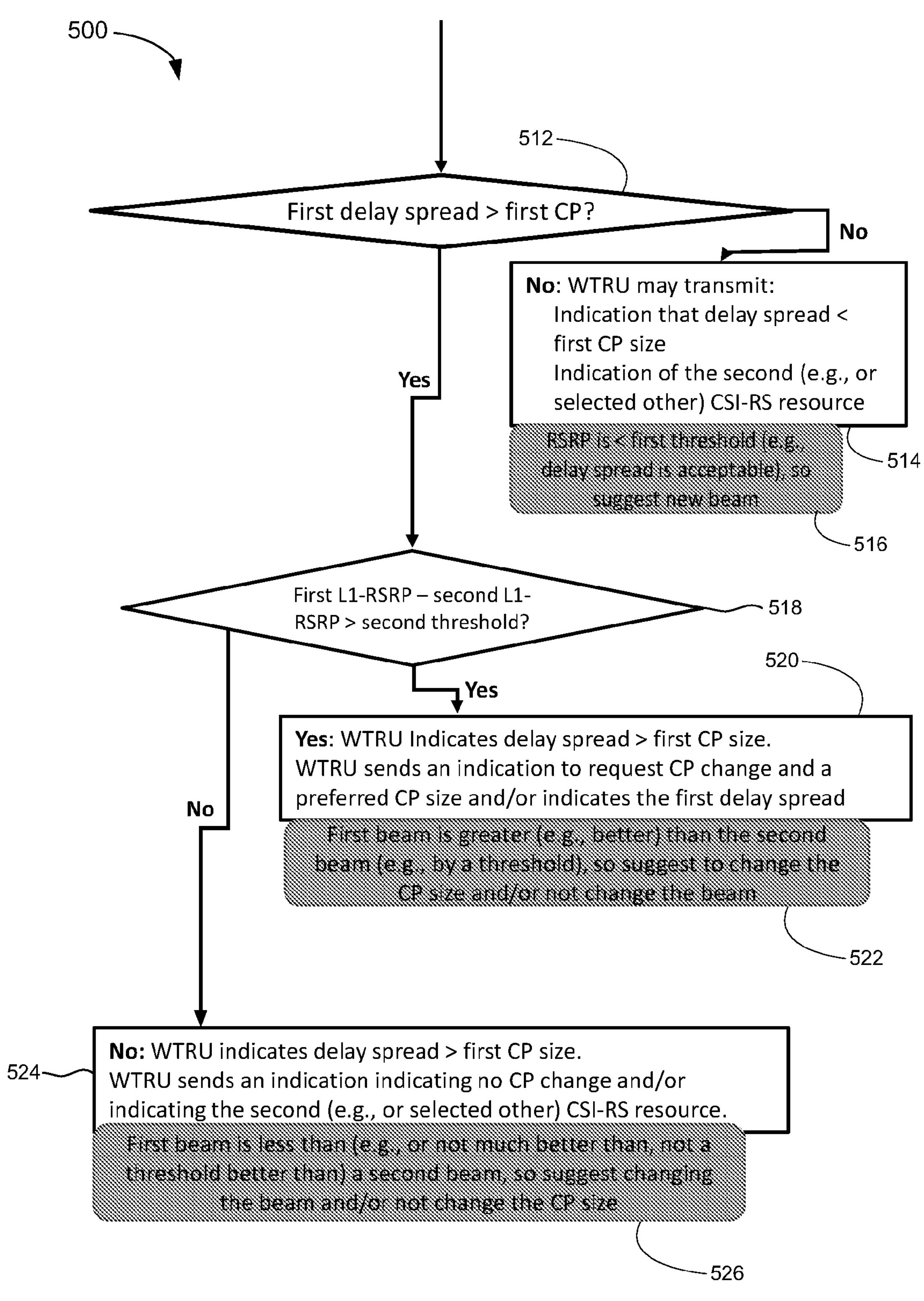

FIGS. 5A and 5B depict a flow diagram illustrating an example delay spread measurement and beam/CP switching process 500. Referring to FIG. 5A, at 502, a WTRU may receive a configuration (e.g., configuration information). The configuration information may include (e.g., indicate) one or more of a set of TCI states (e.g., two or more TCI states), a slot format configuration (e.g., UL, DL, and/or flexible slot(s)), a first CP size (e.g., active CP size), a first CSI-RS resource set (e.g., for use with the first CP size), a second CSI-RS resource set (e.g., for use with a second CP size, for example, greater than the first CP size), a first threshold, and/or a second threshold. The set of TCI states may include a first TCI state and a second TCI state. Alternatively, or additionally, the WTRU may receive, at 502, an indication of a first TCI state (e.g., from the set of TCI states).

At 504, the WTRU may measure an RSRP associated with a first CSI-RS in a resource of the first CSI-RS resource set (e.g., in a DL slot), for example using the first TCI state. The RSRP may exceed the first threshold, for example at 506. For example, the WTRU may determine if the RSRP is greater than the first threshold. At 508, when the first RSRP is greater than the first threshold, the WTRU may measure a second (e.g., other) CSI-RS (e.g., in a flexible slot) in a CSI-RS resource of the second CSI-RS resource set, for example, using a second TCI state (e.g., that is different than the first TCI state). For example, if there are more than 2 TCI states in the set, the WTRU may measure each of the other CSI-RSs, one for each TCI state other than the first TCI state. At 510, the WTRU may determine a first delay spread and/or a first L1-RSRP for the first CSI-RS. At 510, the WTRU may determine a second delay spread and/or a second L1-RSRP for the second CSI-RS. If there are more than 2 TCI states in the set, the second CSI-RS may be selected from the other CSI-RSs, for example, the CSI-RS with the best L1-RSRP and/or a delay spread<first CP.

Referring to FIG. 5B, the example delay spread measurement and beam/CP switching process 500 continues from 510. At 512, the WTRU may determine whether the first delay spread is greater than the first CP size. If the first delay spread is not greater than (e.g., less than or equal to) the first CP size, the WTRU may transmit at 514 an indication that the first delay spread is less than the first CP size and/or an indication of the second (e.g., or selected other) CSI-RS resource. Alternatively, or additionally, at 516 the WTRU may determine that the RSRP is less than a first threshold (e.g., the delay spread is acceptable) and/or suggest a new beam. If the first delay spread is greater than the first CP, the WTRU may determine at 518 whether a difference between a first L1-RSRP and a second L1 RSRP is greater than a second threshold. When the difference between the first L1-RSRP and the second RSRP is greater than the second threshold, the WTRU may indicate at 520 that the delay spread is greater than a first CP size. Additionally, or alternatively, when the difference between the first L1-RSRP and the second RSRP is greater than the second threshold, the WTRU may send at 520 an indication to request a CP change, a preferred CP size, and/or indicate the first delay spread. At 522, the WTRU may suggest a change in CP size and/or not change the beam, for example, because the first beam is greater (e.g., better) than the second beam (e.g., by a threshold). When the difference between the first L1-RSRP and the second RSRP is not greater than the second threshold, the WTRU may indicate at 524 that the delay spread is greater than the first CP size. Additionally, or alternatively, the WTRU may send at 524 an indication indicating no CP change and/or the second (e.g., or selected other) CSI-RS resource. At 526, for example if the first beam is less than (e.g., or not much better than, or not a threshold better than) a second beam, the WTRU may suggest changing (e.g., indicate to change) the beam and/or not changing the CP size.

What is claimed is:

1. A wireless transmit/receive unit (WTRU) comprising:
a processor configured to:
receive configuration information indicating a first transmission configuration indicator (TCI) state, a second TCI state, a first cyclic prefix (CP) size, a first channel state information-reference signal (CSI-RS) resource set, and a second CSI-RS resource set;
determine a first delay spread and a first measurement value associated with a first CSI-RS, wherein the first CSI-RS is received in a first CSI-RS resource based on the first TCI state and the first CP size, wherein the first CSI-RS resource is a CSI-RS resource in the first CSI-RS resource set;
determine a second delay spread and a second measurement value associated with a second CSI-RS, wherein the second CSI-RS is received in a second CSI-RS resource based on the second TCI state and a second CP size, wherein the second CSI-RS resource is a CSI-RS resource in the second CSI-RS resource set; and
send a first indication indicating whether the first delay spread is greater than or less than the first CP size.

2. The WTRU of claim 1, wherein the first indication indicates that the first delay spread is less than the first CP size, and wherein the processor is further configured to send a second indication indicating the second CSI-RS resource.

3. The WTRU of claim 1, wherein the first indication indicates that the first delay spread is greater than the first CP size, and wherein the processor is further configured to:
determine whether a difference between the first measurement value and the second measurement value is greater than a first threshold; and
send a request for a change in CP size if the difference between the first measurement value and the second measurement value is greater than the first threshold, or
send a second indication indicating the second CSI-RS resource if the difference between the first measurement value and the second measurement value is not greater than the first threshold.

4. The WTRU of claim 1, wherein the processor is configured to determine the first and second delay spreads and the second measurement value on a condition that a third measurement value associated with the first CSI-RS is below a second threshold.

5. The WTRU of claim 1, wherein the processor is configured to measure a first reference signal received power (RSRP) associated with a first CSI-RS resource of the first CSI-RS resource set.

6. The WTRU of claim 5, wherein the processor is configured to:
determine whether the first RSRP is greater than an RSRP threshold; and
measure a second RSRP associated with a second CSI-RS resource of the second CSI-RS resource set if the first RSRP is greater than the RSRP threshold.

7. The WTRU of claim 1, wherein the first indication indicates that the first delay spread is greater than the first CP size, and wherein the processor is configured to:
determine whether a difference between the first measurement value and the second measurement value is greater than a first threshold; and
send a second indication indicating the first delay spread if the difference between the first measurement value and the second measurement value is greater than the first threshold.

8. The WTRU of claim 1, wherein the first indication indicates that the first delay spread is greater than the first CP size, and the processor is configured to:
determine whether a difference between the first measurement value and the second measurement value is greater than a first threshold; and
send a request for a change in CP size if the difference between the first measurement value and the second measurement value is greater than the first threshold, or send a second indication indicating the second CSI-RS resource if the difference between the first measurement value and the second measurement value is not greater than the first threshold.

9. The WTRU of claim 1, wherein the processor is configured to send a CSI report that indicates a quantized delay spread associated with the first delay spread and the second delay spread.

10. A method performed by a wireless transmit/receive unit (WTRU), the method comprising:
receiving configuration information indicating a first transmission configuration indicator (TCI) state, a second TCI state, a first cyclic prefix (CP) size, a first channel state information-reference signal (CSI-RS) resource set, and a second CSI-RS resource set;
determining a first delay spread and a first measurement value associated with a first CSI-RS, wherein the first CSI-RS is received in a first CSI-RS resource based on the first TCI state and the first CP size, wherein the first CSI-RS resource is a CSI-RS resource in the first CSI-RS resource set;
determining a second delay spread and a second measurement value associated with a second CSI-RS, wherein the second CSI-RS is received in a second CSI-RS resource based on the second TCI state and a second CP size, wherein the second CSI-RS resource is a CSI-RS resource in the second CSI-RS resource set; and
sending a first indication indicating whether the first delay spread is greater than or less than the first CP size.

11. The method of claim 10, wherein the first indication indicates that the first delay spread is less than the first CP size, and wherein the method further comprises sending a second indication indicating the second CSI-RS resource.

12. The method of claim 10, wherein the first indication indicates that the first delay spread is greater than the first CP size, and wherein the method further comprises:

determining whether a difference between the first measurement value and the second measurement value is greater than a first threshold; and sending a request for a change in CP size if the difference between the first measurement value and the second measurement value is greater than the first threshold, or sending a second indication indicating the second CSI-RS resource if the difference between the first measurement value and the second measurement value is not greater than the first threshold.

13. The method of claim 10, further comprising determining the first and second delay spreads and the second measurement value on a condition that a third measurement value associated with the first CSI-RS is below a second threshold.

14. The method of claim 10, further comprising measuring a first reference signal received power (RSRP) associated with a first CSI-RS resource of the first CSI-RS resource set.

15. The method of claim 14, further comprising:

determining whether the first RSRP is greater than an RSRP threshold; and measuring a second RSRP associated with a second CSI-RS resource of the second CSI-RS resource set if the first RSRP is greater than the RSRP threshold.

16. The method of claim 10, wherein the first indication indicates that the first delay spread is greater than the first CP size, and wherein the method further comprises:

determining whether a difference between the first measurement value and the second measurement value is greater than a first threshold; and sending a second indication indicating the first delay spread if the difference between the first measurement value and the second measurement value is greater than the first threshold.

17. The method of claim 10, wherein the first indication indicates that the first delay spread is greater than the first CP size, and the method further comprises:

determining whether a difference between the first measurement value and the second measurement value is greater than a first threshold; and sending a request for a change in CP size if the difference between the first measurement value and the second measurement value is greater than the first threshold, or sending a second indication indicating the second CSI-RS resource if the difference between the first measurement value and the second measurement value is not greater than the first threshold.

18. The method of claim 10, further comprising sending a CSI report that indicates a quantized delay spread associated with the first delay spread and the second delay spread.

* * * * *